UNITED STATES PATENT OFFICE.

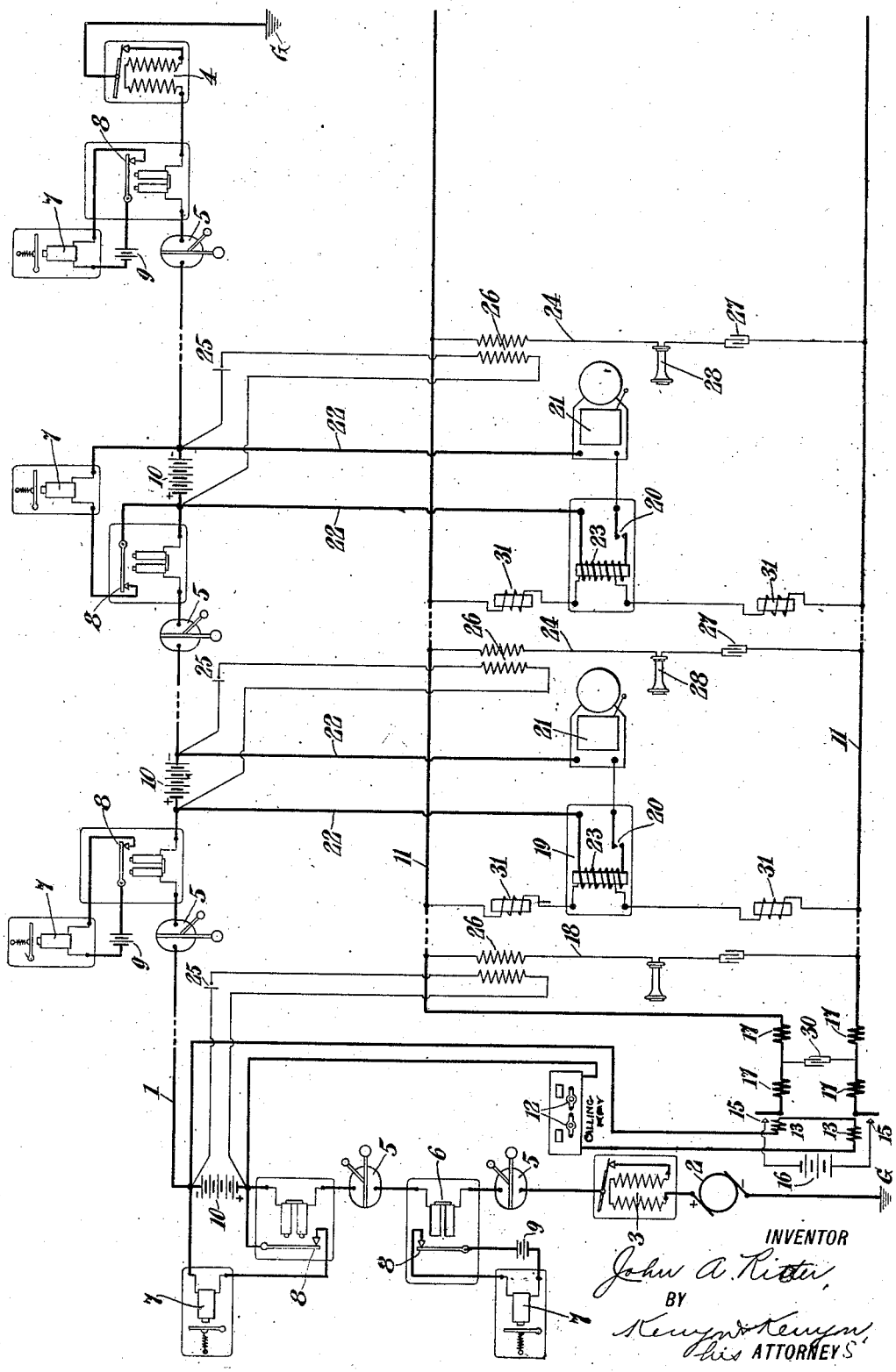

JOHN A. RITTER, OF NEW YORK, N. Y., ASSIGNOR TO HALL SWITCH & SIGNAL CO., A CORPORATION OF MAINE.

SYSTEM OF DISTRIBUTION.

1,274,601. Specification of Letters Patent. Patented Aug. 6, 1918.

Application filed October 23, 1915. Serial No. 57,478.

*To all whom it may concern:*

Be it known that I, JOHN A. RITTER, a citizen of the United States, and a resident of the city, county, and State of New York, have invented certain new and useful Improvements in Systems of Distribution, of which the following is a specification.

My invention relates to a method and apparatus for storing energy at points along a line and for utilizing this energy for operating any suitable device or devices.

My invention relates particularly to a telegraph system in which are connected a plurality of energy storing devices which are charged during the normal operation of a telegraph line, which stored energy is supplied for the operation of any suitable device or devices located adjacent the storage devices.

My invention is readily adaptable to the combination of a telegraph, selector and telephone system, and has been hereinafter described in that combination, but the invention is not limited to this embodiment.

In selector systems, as heretofore devised, the substation signals have been operated either over the main line by the main line battery, or from a local primary battery at the substation. The operation of the selective signals on main line battery has been satisfactory, but the telephones do not operate satisfactorily on main line battery in view of the resistance of the line to the farthest signal station and other factors which make the operation of the telephone over long lines from a central battery unreliable.

The operation of a local signal, or other device, from a primary battery has the disadvantage that the batteries must have frequent attention and this entails considerable expense in order to keep the primary batteries in condition.

By the employment of my invention all the disadvantages above enumerated are overcome and the advantages of the local battery are retained, so that by the use of my system a line of indefinite length may be employed without the trouble and expense incident to the local primary battery system, and the operation of the system is entirely reliable.

The preferable embodiment of my invention consists in the combination of a telegraph line and a selector line, with energy storing devices associated with the telegraph line, and means for supplying the energy necessary for the operation of the telegraph line and for keeping the energy storing devices charged at all times and automatically. By suitable arrangement the circuit of the selector signal is so related to the energy storing devices that when the selector contacts are closed, the local selector signal apparatus will be operated from the corresponding energy storing device. It is here noted that many devices may be operated from the storage device, of which the selector signal may be one.

The telephones for the selector line are also supplied with energy from a corresponding storage device, thereby making it unnecessary to maintain primary batteries for this purpose. Any of the well-known arrangements may be provided for furnishing to the central or despatching, or other calling, office, an answerback for advising the caller that the substation bell, or other device, has actually operated.

Other and further objects and advantages will be seen by reading and considering the following description taken in connection with the accompanying drawings, forming part of this specification, and in which is represented diagrammatically one illustrative embodiment of my invention.

The specific illustration shown in the accompanying drawings, which will now be described, consists in a telegraph line 1. This line may be grounded at the points G, and is supplied with energy from the generator 2. Between the generator and the line is a polarized circuit breaker 3 and a like circuit breaker 4 is connected between the other end of the line and the ground. The purpose of these circuit breakers is to open the circuit of the line in the event that for any reason the polarity of the line becomes reversed, which, but for this reason, might cause the energy storing devices along the line to discharge. Connected in the line 1 are the ordinary telegraph keys 5 and relay devices 6. Associated with the relays 6 are the sounders 7. These sounders are operated by the relays through the contacts 8 and some of them are supplied with energy from local primary batteries 9. I have also shown some of the sounders 7 as supplied with energy from the storage devices 10 and it is evident that they all may be thus supplied. Also connected in the line 1 are energy storing devices 10 which may be ordinary storage batteries. The telegraph system operates in the usual manner, but the supply of energy thereto is in excess of that required by the relays 6, and any other telegraph apparatus that may be on the line, and this excess of energy is stored in the storage batteries 10. These batteries are charged whenever the telegraph circuit is closed. It is customary in telegraph lines that they remain closed when not in use, but this is not essential to my invention as the batteries 10 may be charged during the operation of the telegraph instruments.

The selector line is represented by the wires 11 and runs along the same general route followed by the telegraph line. In fact, it is customary for railroads to have at least one telegraph line running throughout the length of the road for the purpose of private communication. This line is represented by the numeral 1 in the accompanying drawings. The selector line 11 is placed along the railroad for train despatching, or other, purposes. Connected to the line 11 is shown diagrammatically the despatcher's calling outfit consisting of keys 12, relay 13, which may be supplied from one of the batteries 10. The relay 13 closes the contacts 15 and puts the battery 16 on the selector line through the inductance 17. A condenser 30 is connected between the lines 11 and inductance 17. A telephone set 18 of the ordinary type is connected across the selector line at the despatcher's office. Selectors 19 are shown diagrammatically and are connected across the line at the different substations through the inductance 31. These selectors, which may be any of the well-known kinds, control selectively the contacts 20, which contacts close the operating circuit of the bell 21. Each of the bell circuits 22 is connected across one of the energy storage devices 10 in the telegraph line. Also included in the circuit 22 is an answerback coil 23 in inductive relation with the selector line so that when the bell 21 operates there will be a flutter in the telephone 18 at the despatcher's station.

Connected also across the line 11 are local telephone circuits 24, comprising a transmitter 25, induction coil 26, condenser 27, and receiver 28. The transmitter circuit for each telephone, including the ordinary transmitter and the primary induction coil, are connected directly across the storage device 10. By this arrangement the storage devices furnish energy to the telephones which are connected across the selector line.

It is evident that more than one bell 21 might be connected to any storage device 10. The bells are ordinarily operated selectively and therefore only one operates at a time, but any reasonable number of bells may be furnished with power by any given storage device. More than one bell may operate at the same time, if desired, the only limitation being that the bells which are connected across any storage device are not operated in such numbers or with such frequency as to keep the storage devices exhausted. While in the drawings the storage devices have been diagrammatically indicated as of equal capacity, my invention is in no way limited to this arrangement, it being understood that these devices may be of any capacity necessary for the work which is to be done by each of them.

While I have shown only one source of supply for the telegraph line, it is clear that there may be more than one source connected in series in the line.

I preferably use as energy storing devices the ordinary storage battery, but my invention is in no wise limited to the use of this kind of storing device. In the use of the storage battery for the purpose indicated it is extremely important that the same be insulated from the ground. This end can be accomplished in any of the well-known ways of insulating storage batteries and therefore no specific way of accomplishing this is shown in the drawings.

The operation of the system illustrated in the drawings is as follows:

The telegraph line being closed, the batteries 10 are slowly charged from the generator 2 during the time the telegraph line is closed. The telegraph system operates otherwise in the ordinary manner.

When the despatcher desires to call one of the selector stations, he presses the key 12 and sends out the required number of impulses. These impulses operate the selectors of the selector line and the selector responding to that particular number or combination of impulses closes its contacts 20. These contacts being closed complete the circuit of bell 21, and the battery 10 will cause the bell 21 to operate. The operation of this bell inductively produces an answerback which is received in the receiver of the telephone at the despatcher's office. When the bell 21 operates, the operator at the station called removes his telephone 28 from the hook and thereby connects the same across the selector circuit and the battery 10 and is then in position to converse with the despatcher over the selector circuit.

From the above description it will be seen that I have provided a system in which the sources for the local selector signals, or other devices, are continuously kept charged without the necessity of an attendant to look after this matter. The telegraph line is operative and efficient for the reason that the batteries 10 have a comparatively small internal resistance and therefore offer slight resistance to the flow of the current from the generator 2. It is desirable that the storage batteries 10 have the usual provisions for preventing the evaporation of the electrolyte therefrom so that the maintenance of the storage batteries will be reduced to the lowest possible limit.

In the drawing only two circuits have been shown as fed by each storage device, but I wish it understood that each storage device may supply more than two circuits. In connecting more than one circuit onto the batteries 10, I prefer to connect the circuits directly to the battery terminals so as to avoid any possible cross-talk in the telephones.

While the illustrated embodiment shown in the drawing combines a selector system and telegraph system, it is to be understood that my invention applies to the combination of a telegraph and telephone circuit in which the transmitter circuits of the telephones are energized from the storage devices of the telegraph or other line including these storage devices. In this connection I wish it to be understood that if along a given route a selector or a telephone circuit is installed, and there are two or more telegraph lines, it is within my invention to connect in series with each of the lines some of the storage devices for supplying the energy for the telephone transmitters, selector bells or any other devices instead of placing all of the storage devices on one line.

Many changes and re-arrangements of the apparatus disclosed in my invention may be made without departing from my invention as disclosed, and the following claims are intended to cover the invention as shown and described, or any obvious modification thereof.

Having described my invention, what I claim as new and desire to secure by Letters Patent is:

1. A circuit having in one line telegraph transmitting and receiving apparatus, a plurality of storage batteries in series with said telegraph transmitting and receiving apparatus, local circuits in series with said storage batteries adapted to be operated irrespective of the energization of the line, and a generator in series with said line.

2. A circuit having telegraph transmitting and receiving apparatus, a plurality of electric storage devices in series with said apparatus, local circuits adapted to be operated by said storage batteries irrespective of the energization of the main circuit, and a generator for charging the storage batteries.

3. A circuit having telegraph transmitting and receiving apparatus, and an electric storage device therein, a source of supply for operating said circuit and charging said storage device in series, and a local circuit in series with said storage device adapted to be operated irrespective of the energization of the main circuit.

4. An electric circuit having a plurality of electric storage devices and telegraph transmitting and receiving apparatus in series therein, a source of supply for operating said apparatus and maintaining said storage devices charged, and local circuits adapted to be operated from the storage devices irrespective of the energization of the main circuit.

5. In a system of the character described, the combination of a line, a plurality of storage batteries in series in said line, translating devices in said line, a source of supply for operating said translating devices and keeping said batteries charged, a local circuit supplied by each storage battery, a selector circuit, selectors in said selector circuit and contacts in each local circuit adapted to be closed by said selectors.

6. In a system of the character described, the combination of a telegraph line, a source of supply adapted to supply to said line energy in excess of that required by said telegraph line, storage means for said excess energy, a selector line, selectors thereon, signals under the control of said selectors and means for utilizing the excessive energy supplied to said telegraph line for operating said signals.

7. The combination of a telegraph line and a selector line, means for normally supplying to the telegraph line energy in excess of that required by the telegraph line, selectors on the selector line, signals controlled by said selectors and means for utilizing the excess energy supplied to the telegraph line to operate signals.

8. The combination of two power consuming circuits, translating devices in each of said circuits, a source of supply for one of the circuits adapted to supply energy in excess of that required by the translating devices of that circuit, and means connected in series in said circuit for utilizing the excessive energy of one circuit for operating the translating devices of the other circuit.

9. A system of distribution comprising a circuit, telegraph transmitting and receiving apparatus in said circuit, means for supplying to said circuit energy in excess of that required by said circuit, means connected in series for storing said excess energy and a circuit energized by each of said storage means.

10. In combination, a power circuit, means for supplying to said circuit energy in excess of that required by said circuit, means for storing said excess energy, a selector line, selectors on said line, means for operating said selectors, signal devices controlled by said selectors and circuits for said signal devices whereby said signal devices are energized by said excess energy.

11. In a system of the character described, the combination of a telegraph line, means for supplying energy to said line intermittently in excess of that required by said line and for conserving said excess energy at points along said line, selectively controlled signals and means whereby said signals are operated by said excess energy.

12. In a system of the character described, the combination of a telegraph line, means for supplying energy to said line intermittently in excess of that required by said line and means connected in series for conserving said excess energy at points along said line, signals and means whereby said signals are operated by said excess energy irrespective of the energization of the line.

13. In a combined telegraph, telephone and selector system, the combination of a source of supply, a plurality of energy storage devices fed by said source and located at different points on said line, selectors on said line, signals at points along said line controlled by said selectors, said signals being operated by energy from said storage devices.

14. In a system of the character described, the combination of a telegraph line, energy storing devices associated with said line, a selector line, selectors thereon, signals controlled by said selectors, a circuit for each signal energized from one of said storing devices and a telephone on the selector line also energized from one of said storage devices.

15. In a system of the character described, the combination of a telegraph line, energy storing devices associated with said line, a selector line, selectors thereon, signals controlled by said selectors, a circuit for each signal energized from one of said storing devices, a telephone on the selector line also energized from one of said storage devices and answerback means associated with said selector line and one of said signals.

16. In a system of the character described, the combination of a telegraph line, relays in series therein, storage devices in series in said line, a selector circuit, signals along the selector line and means whereby the signals are operated selectively from said storage devices.

17. In a system of the character described, the combination of a telegraph line, energy storing devices associated therewith, a selector line, signals along said selector line and means for selectively operating said signals with energy from said storage devices.

18. In a system of the character described, the combination of a telegraph line, a plurality of energy storing devices associated with said line at different points, a selector line, signals along said selector line and means for operating at least one signal from each of said storage devices.

19. In a system of the character described, the combination of a telegraph line, a plurality of energy storing devices associated with said line at different points, a second line, signals along said second line and means for operating at least one signal from each of said storage devices.

20. In a system of the character described, the combination of a telegraph line, a source of supply adapted to supply to said line energy in excess of that required by said telegraph line, storage means connected in series for said excess energy and a plurality of local circuits supplied by said excess energy and adapted to be operated irrespective of the energization of the line.

21. The combination of a telegraph line and a selector line, means for normally supplying to the telegraph line energy in excess of that required by the telegraph line selectors on the selector line, circuits controlled by said selectors and adapted, when closed, to be energized by the excess energy furnished said telegraph line.

22. In combination, a power circuit, means for supplying to said circuit energy in excess of that required by said circuit, means for storing said excess energy, a selector line, selectors on said line, means for operating said selectors, circuits controlled by said selectors and adapted, when closed, to be energized by energy from said storage devices.

23. In a system of the character described, the combination of a telegraph line, means for supplying energy to said line intermittently in excess of that required by said line and means connected in series for conserving said excess energy at points along said line, a plurality of circuits adapted, when closed, to be energized by said excess energy irrespective of the energization of the line.

24. In a system of the character described, the combination of a telegraph line, a plurality of electric storage devices in series in said line, a source of supply for said line and for charging said storage devices, a second line, telephones on said second line and connections whereby the transmitter circuits of said telephones are energized by energy from said storage devices.

25. In a system of the character described, the combination of a telegraph line, means for supplying energy to said line intermittently in excess of that required by said line and means connected in series for conserving said excess energy at points along said line, telegraph instruments and means whereby said telegraph instruments are operated by said excess energy irrespective of the energization of the line.

In testimony whereof I have signed my name to this specification.

JOHN A. RITTER.